UNITED STATES PATENT OFFICE.

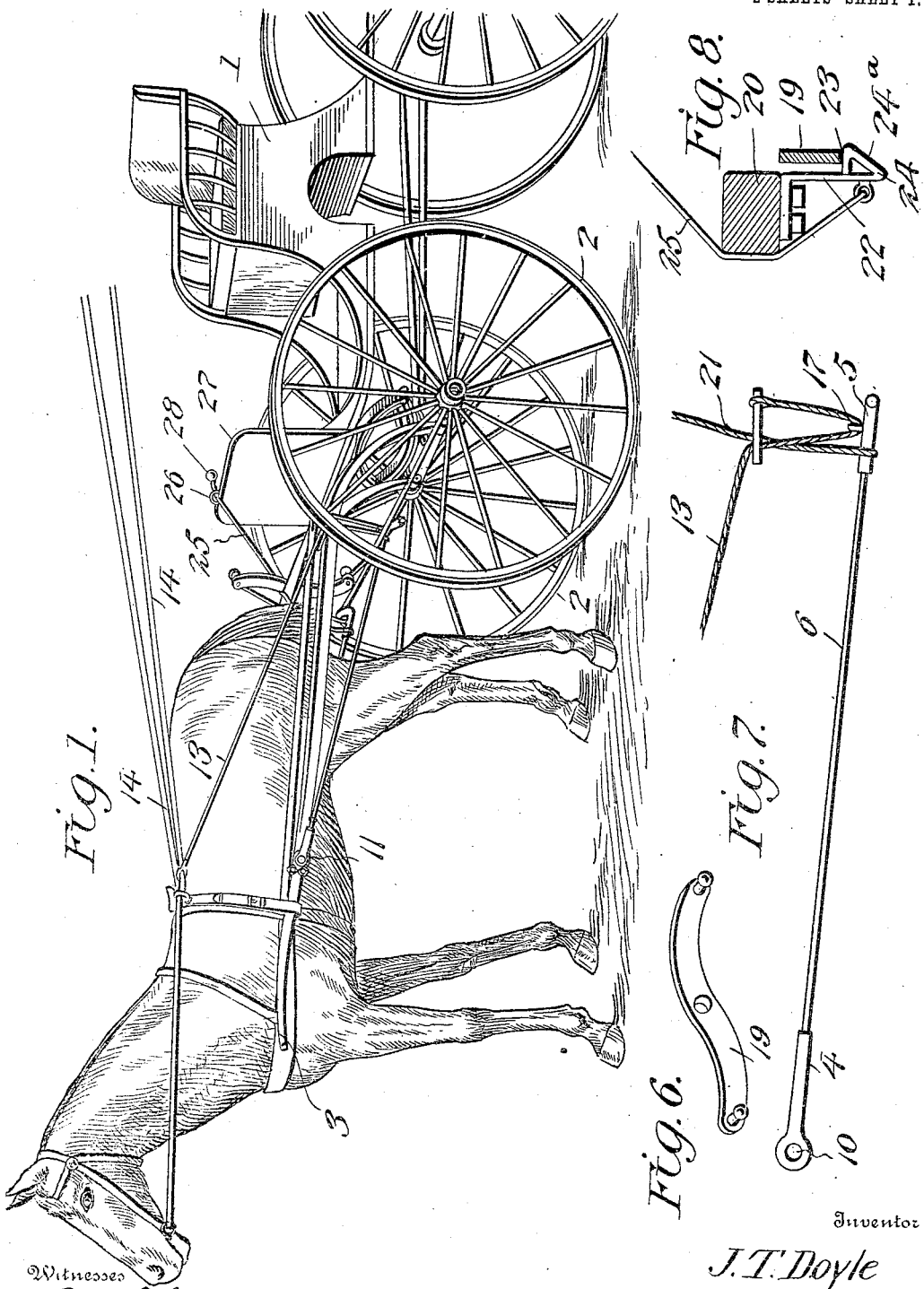

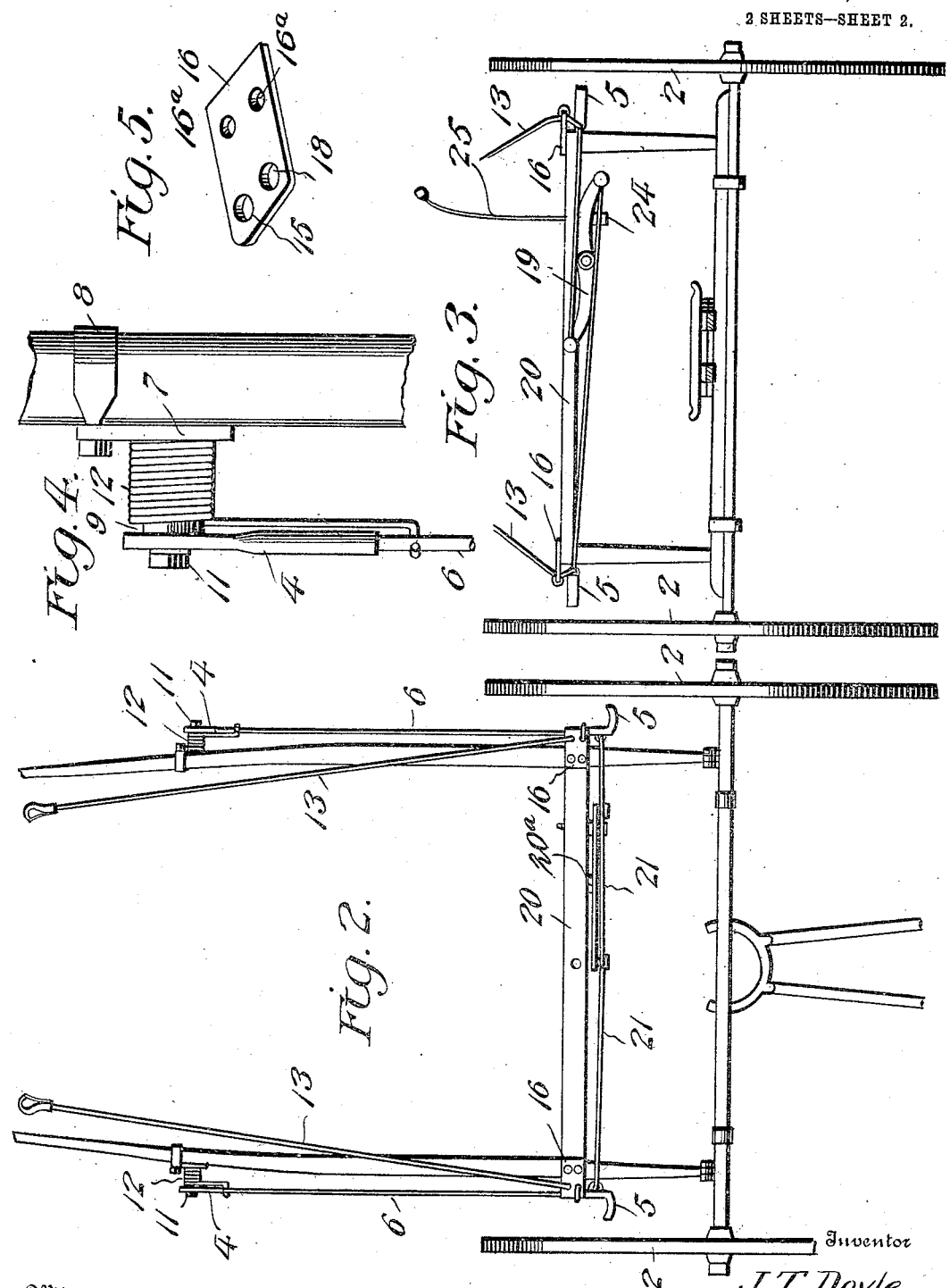

JAMES T. DOYLE, OF AUBURN, NEW YORK.

HORSE HITCH AND CHECKING DEVICE.

944,547.  Specification of Letters Patent.  Patented Dec. 28, 1909.

Application filed August 10, 1905. Serial No. 273,646.

*To all whom it may concern:*

Be it known that I, JAMES T. DOYLE, citizen of the United States, residing at Auburn, in the county of Cayuga and State of New York, have invented new and useful Improvements in Horse Hitch and Checking Devices, of which the following is a specification.

My invention relates to horse hitches and checking devices, and one of its objects is to provide a device of this character which is adapted to timely check any capricious movement of a horse and compel it to remain in the position in which it was left.

With the above and other objects in view, the invention consists in the construction, combination and arrangement of parts hereinafter fully described, claimed and illustrated in the accompanying drawings, wherein the preferred embodiment of my invention is illustrated and in which:

Figure 1 is a view in side elevation of a vehicle with a horse attached, illustrating the application of my invention. Fig. 2 is a top plan view of the shafts and the front portion of the running gear of the vehicle. Fig. 3 is an elevational view of that portion of the vehicle illustrated in Fig. 2. Fig. 4 is a detail plan view of one of the shafts and operating bars, illustrating the manner in which the bars are adapted to be secured in applied position. Fig. 5 is a detail perspective view of one of the guide plates. Fig. 6 is a detail perspective view of the lever by means of which the operating bars can be moved into inoperative positions. Fig. 7 is a side elevation of one of the operating bars. Fig. 8 is a vertical sectional view through the connecting bar of the vehicle shafts.

Referring to the drawings by reference numerals, 1 designates a vehicle of a conventional type, 2 its front wheels and 3 its shafts.

Operating bars are pivotally mounted for vertical movements preferably upon the outer sides of the shafts 3, and each consists of a securing head 4, a wheel engaging or free end 5 and a spring portion 6. The wheel engaging or free end 5 of each operating bar is adapted to occupy a position between two of the spokes of one of the vehicle wheels when the bar is in operative position. Base plates 7 are secured upon the outer sides of the shafts 3 by means of clips 8. Studs 9 are secured to and project from the plates 7 and have their ends reduced to be loosely received by eyes 10 of the securing heads 4. The reduced ends of the studs 9 are screw-threaded for the reception of nuts 11 which pivotally retain the operating bars on the studs. Springs 12 are coiled about the enlarged portions of the studs 9 and each has one of its ends secured to each of the base plates 7. The other ends of the springs are extended for short distances parallel with and then bent to embrace the operating bars. The springs are adapted to yieldingly support the operating bars, the bars being preferably supported in parallel relation to the shafts 3 of the vehicle. When in operative positions, the operating bars are adapted to be moved downwardly under the tension of the springs by the movement of the horse in a forward or sidewise direction. When in such supported positions, the operating bars are not liable to be injured, and do not form obstructions or mar the appearance of the vehicle. The springs tend to move the operating bars into positions where no tension will be placed on the reins, and when the bars are not in use yieldingly support the bars in such positions. Supplemental reins or members 13 are secured at their front ends to the main reins 14 just in rear of the terrets, and have their rear ends passed through openings 15 in guides 16, then through eyes 17 secured to the wheel engaging ends 5 of the operating bars, and thence through eyes 18 in the guides 16 whence they are suitably secured, said guides 16 being secured to the shafts 3 by means of screws or other fastening means passing through openings 16ª in said guides and engaging the shafts.

The operating bars are normally held in operative positions, that is, their wheel engaging or free ends are normally held in operative relation to the front wheels of the vehicle by the spring portions 6 thereof. The operating bars are adapted to be moved into and held in inoperative positions, that is, their wheel engaging or free ends are adapted to be moved and retained out of operative relation with the vehicle wheels by means of a lever 19 and spring catch 24. The spring portions 6 of the operating bars are under tension when the bars are in inoperative positions, whereby when the operating bars are released the spring portions thereof move the wheel engaging ends into operative relation with the vehicle wheels, that is to say, the operating bars are automatically moved into operative positions. The automatic movement of each operating bar is at an angle to its pivotal movement. It should be noted that portions of the operating bars beyond their pivots have automatic movements.

The lever 19 is pivotally mounted at a point between its ends upon the connecting bar 20 of the shafts 3 by a member 19ª, see Fig. 2 of the drawings, and it is connected at its ends to the operating bars by means of flexible or other suitable members 21. The connection between the lever and operating bars is such that when the lever is turned in one direction, the bars are moved into inoperative positions. The lever is adapted to be held in position to retain the operating bars in inoperative positions by means of the spring catch 24. The spring catch is secured to the connecting bar 20 at one side of the pivot of the lever and is provided with a shoulder 23, which normally lies in the path of the movement of the lever 19, and with an inclined face 24ª. When the lever 19 is operated to move the operating bars into inoperative positions, it rides over the inclined face 24ª and moves the catch to withdraw the shoulder 23 out of its path of movement. Immediately after the lever passes the shoulder 23, the catch returns to its normal position, placing the shoulder in the path of the movement of the lever so that when the lever is released it will be moved by the spring portions 6 of the operating bars to engage the shoulder and be thereby held in position to retain the operating bars in inoperative positions. The catch 24 is adapted to be withdrawn to release the lever by means of a flexible or other suitable member 25, which is secured at one end to an eye upon the catch. The other end of the member 25 is passed through an eye 26 on the upper edge of the dash-board 27 of the vehicle and is provided with a handle 28 disposed within convenient reach of the occupant of the vehicle.

The operation of my improved hitching and checking device may be stated to be as follows: When it is desired to use the device, the occupant withdraws the catch 24 through the medium of the member 25 before leaving the vehicle. The withdrawal of the catch releases the lever 19, whereupon the operating bars are automatically moved into operative positions by the spring portions 6 thereof. A forward movement of the horse will turn the wheels in a direction to move the operating bars downwardly under the tension of the springs, which movements of the bars will, through the medium of the supplemental reins 13, pull rearwardly on the reins 14, thus checking the movement of the horse and causing it to move rearwardly until the springs return the bars to positions where all tension is removed from the reins. A movement of the horse to one side will turn the wheel on that side of the vehicle farthest removed from the direction in which the horse is moving in a direction to move the operating bar connected therewith downwardly, and the rein connected with said operating bar will be pulled rearwardly, resulting in checking the movement of the horse and causing it to move in the reverse sidewise direction until the spring of said operating bar returns it to a position where all strain is removed from the rein with which said operating bar is connected. A rearward movement of the horse will be stopped by the wheel engaging ends of the operating bars engaging the spokes and holding the wheels against movement.

It should be apparent from the above description taken in connection with the accompanying drawings, that I provide a device which will hitch and check a horse, that it may be applied to any character of vehicle, and that it is effective and positive in operation.

Having thus described my invention what I claim is:

1. In a horse hitch and checking device, in combination with a vehicle, a resilient operating bar secured at its forward end to one of the shafts of the vehicle, its free end adapted to move outwardly to engage one of the wheels, and means to retract said free end at will.

2. In a horse hitch and checking device, in combination with a vehicle, an operating bar secured at its forward end to a shaft of the vehicle, its free end adapted to move outwardly to engage one of the wheels between the spokes, means connecting the operating bar and the driving rein, and means to retract the free end of the operating bar at will.

3. In a horse hitch and checking device, in combination with a vehicle, an operating bar secured at its forward end to a shaft of the vehicle, and substantially in parallelism therewith, its free end adapted to move outwardly to engage one of the wheels, and means to retract the free end at will.

4. In a horse hitch and checking device, in combination with a vehicle, an operating bar secured at its forward end to a shaft of the vehicle, its free end adapted to move outwardly to engage one of the wheels and to move downwardly as the wheel advances, means to retract said free end, and means to return said operating bar substantially to parallelism with the shaft.

5. In a horse hitch and checking device, in combination with a vehicle, an operating bar secured at its forward end to a shaft of the vehicle, its free end adapted to move outwardly to engage one of the wheels and to move upwardly or downwardly with the movement of the wheel, and a connection between the free end of the operating bar and one of the driving reins.

6. In a horse hitch and checking device, in combination with a vehicle, an operating bar pivotally secured at its forward end to a shaft of the vehicle, its free end adapted to move outwardly to engage one of the wheels, and to move upwardly or downwardly with the movement of the wheel, and a spring between the shaft and operating bar to retain the latter substantially in parallelism with the shaft when said bar is out of engagement with the wheel.

7. In a horse hitch and checking device, in combination with a vehicle, an operating bar pivotally secured at its forward end to a shaft of the vehicle, its free end adapted to move outwardly to engage one of the wheels, means to retract the free end, and a coil spring between the shaft and the operating bar to retain the latter substantially in parallelism with the shaft when said bar is withdrawn from engagement with the wheel.

8. In a horse hitch and checking device, in combination with a vehicle, an operating bar pivoted at its forward end upon a stud on a shaft, a coil spring on the stud and engaging with the operating bar to retain the latter substantially in parallelism with the shaft when out of engagement with the wheel.

9. In a horse hitch and checking device, in combination with a vehicle, operating bars secured at their forward ends to the shafts of the vehicle, the free ends of said bars adapted to move outwardly to engage the wheels, and a connection between the free ends of the operating bars whereby the free ends of said bars may be simultaneously retracted.

10. In a horse hitch and checking device, in combination with a vehicle, operating bars secured at their forward ends to the shafts of the vehicle, the free ends of said bars adapted to move outwardly to engage the wheels, and a flexible connection between the free ends of the operating bars whereby the free ends of said bars may be simultaneously retracted.

11. In a horse hitch and checking device, in combination with a vehicle, an operating bar secured at its forward end to a shaft of the vehicle, and having its rear end free, a lever pivoted on the shaft connecting bar, and a connection between the end of the lever and the free end of the operating bar.

12. In a horse hitch and checking device, in combination with a vehicle, operating bars secured at their forward ends to the shafts of the vehicle, their free ends adapted to move outwardly to engage the wheels, a rocking lever pivoted on the shaft connecting bar, connections between the lever and the free ends of the operating bars to retract the latter, and a latch to hold the lever down when the operating bars are retracted.

13. In a horse hitch and checking device, in combination with a vehicle, operating bars secured at their forward ends to the shafts of the vehicle, their free ends adapted to move outwardly to engage the wheels, a rocking lever pivoted on the shaft connecting bar, connections between the lever and the free ends of the operating bars to retract the latter, and a latch to hold the lever down when the operating bars are retracted, and means to release the said latch.

14. In a horse hitch and checking device, in combination with a vehicle, an operating bar secured at its forward end upon the shaft of the vehicle, and having its rear end free, a guide upon the shaft, a supplemental rein connecting with the driving rein and passing through the guide and engaging with the free end of the operating bar, and secured to the guide by its rear end.

15. In a horse hitch and checking device, in combination with a vehicle, operating bars secured at their forward ends to the shafts of the vehicle, having their rear ends free and adapted to move outwardly to engage the wheels, a rocking lever pivoted on the shaft connecting bar, connections between the lever and the free ends of the operating bars to retract the latter, a latch to hold the lever down when the operating bars are retracted, and means between the vehicle and the latch to move the latter at will to release the retracting lever.

16. The combination with a vehicle, of an operating bar mounted for pivotal movement in one direction, means for inducing automatic movement of a portion of the bar beyond the pivotal support in a direction at an angle to its pivotal movement, such automatic movement throwing the bar into operative engagement with one of the wheels of the vehicle, a member by means of which the bar can be connected to a horse's bit, and means by which the bar may be held against such automatic movement.

17. A horse hitch comprising an operating bar mounted for pivotal movement in one direction, means for inducing automatic movement of a portion of the bar beyond the pivotal support in a direction at an angle to its pivotal movement, a member by means of which the bar can be connected to a horse's bit, means adapted to yieldingly support the bar, and means adapted to hold the bar against such automatic movement.

18. A horse hitch comprising a spring bar mounted for pivotal movement, the spring movement of the bar operating at an angle to its pivotal movement, a member by means of which the bar can be connected to a horse's bit, and means adapted to hold the bar against such spring movement.

19. A horse hitch comprising a spring bar mounted for pivotal movement, the spring movement of the bar operating at an angle to its pivotal movement, a member by means of which the bar can be connected to a horse's bit, means adapted to yieldingly support the bar, and means adapted to hold the bar against such spring movement.

20. A horse hitch comprising a spring bar mounted for pivotal movement, the spring movement of the bar operating at an angle to its pivotal movement, a member by means of which the bar can be connected to a horse's bit, means adapted to hold the bar against such spring movement, a pivotally-mounted lever, a connection between the lever and bar, and means adapted to hold the lever against movement.

In testimony whereof I affix my signature, in presence of two subscribing witnesses.

JAMES T. DOYLE.

Witnesses:
T. E. TEN EYCK,
D. P. QUIGLEY.